Figure 3:
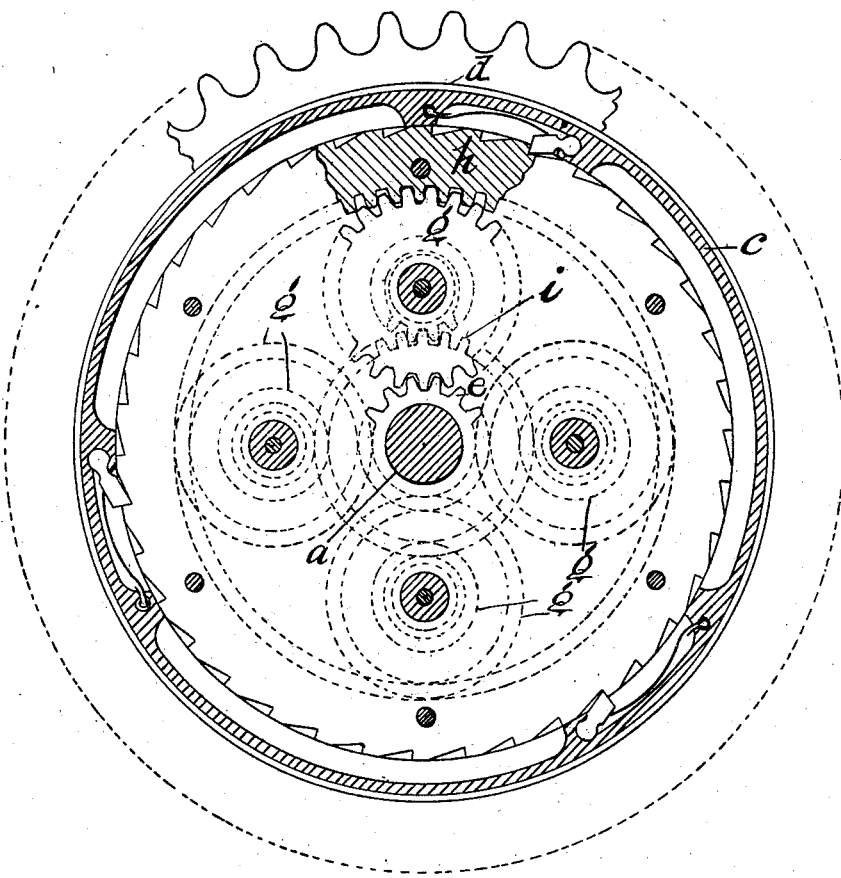

No. 859,422. PATENTED JULY 9, 1907.
A. J. ALLEN.
THREE SPEED MECHANISM.
APPLICATION FILED SEPT. 24, 1906.
2 SHEETS—SHEET 1.
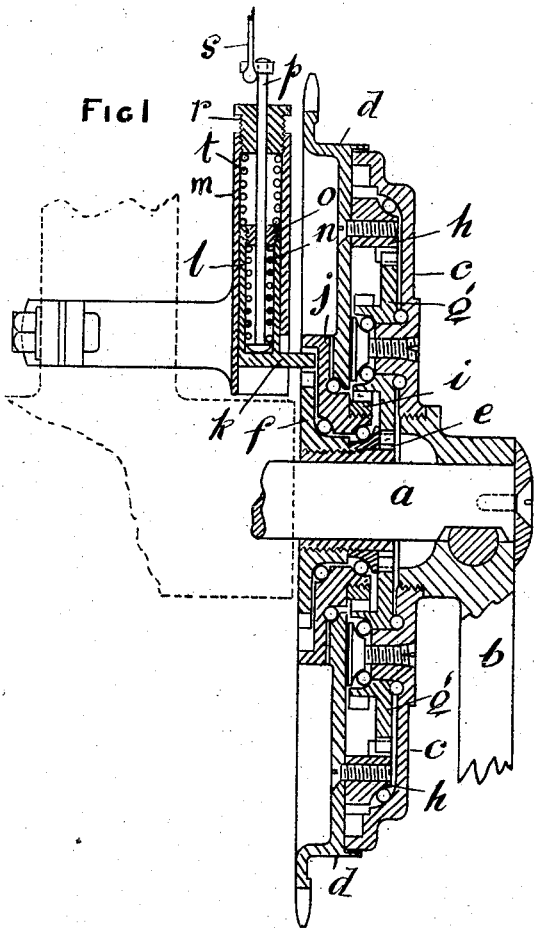
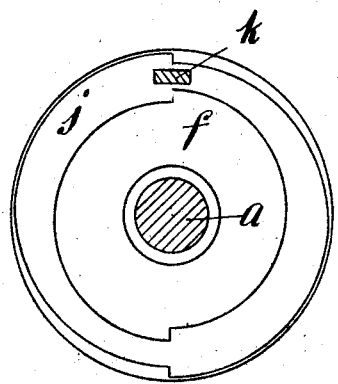
Witnesses:
Marie M. Hovey
Mary L. Hamm
Inventor:
Alfred Jukes Allen
by
Alfred Müller
Attorney.

No. 859,422. PATENTED JULY 9, 1907.
A. J. ALLEN.
THREE SPEED MECHANISM.
APPLICATION FILED SEPT. 24, 1906.

2 SHEETS—SHEET 2.

WITNESSES:
W. Rabsilber.
L. H. Staaden.

INVENTOR:
Alfred J. Allen

UNITED STATES PATENT OFFICE.

ALFRED JUKES ALLEN, OF LONDON, ENGLAND.

THREE-SPEED MECHANISM.

No. 859,422.          Specification of Letters Patent.          Patented July 9, 1907.

Application filed September 24, 1906. Serial No. 336,039.

*To all whom it may concern:*

Be it known that I, ALFRED JUKES ALLEN, a subject of His Majesty the King of Great Britain, and a resident of 17 Well Walk, Hampstead, London, in England, have invented certain new and useful Improvements in Three-Speed Mechanism, and of which the following is a specification.

This invention relates to a three-speed mechanism applicable to bicycles, automobiles and like vehicles.

The object of my invention is to transmit motion from a driving shaft or other body (hereinafter called the driver) to a concentric pulley or other rotating part moving at the same speed as the driver, or at one of two higher speeds. For this purpose I connect the driver and pulley by a ratchet wheel and pawl in the manner of the well known "free wheel" arrangement, so that the pulley is normally driven at the same speed as the driver, but can overrun it when a higher speed than that of the driver is desired. This increase of speed I accomplish in the following way:—On an eccentric pin carried by the driver I mount freely a compound pinion, of which one wheel engages with an internally toothed ring carried by the pulley. The two wheels forming the compound pinion engage with two cog wheels mounted freely on the central shaft and hereinafter called the sun-wheels. Either of these sun wheels may be prevented from revolving in a manner to be hereinafter described. When the smaller sun-wheel is prevented from revolving, as hereinafter described, the planet wheel or pinion engaging with it is forced to revolve against it and so to drive the pulley at a higher speed than the driver. When the larger sun wheel is prevented from revolving as hereinafter described, the planet wheel or pinion engaging with it is forced to revolve against it and so to drive the pulley at a still higher speed than the driver. I thus obtain a normal low speed of the pulley and two higher speeds, without varying the speed of the driver.

A constructional form of my invention as applied to the crank shaft of a bicycle is shown in the accompanying drawings, in which;

Figure 1 is a sectional view of the mechanism and Fig. 2 is a side view of the stop disks. Fig. 3 is a rear elevation in section showing the one way clutch and the internal gear.

$a$ is the crank axle of the bicycle, $b$ the crank and $c$ a circular plate or disk attached to the crank, so that $a$, $b$ and $c$ all turn together.

$d$ is a sprocket wheel carrying the driving chain of the bicycle, and having a free-wheel arrangement between it and the plate $c$, so that it must turn with the latter when the crank is revolved in a forward direction, but is free at the same time to overrun it.

A cog wheel $e$ connected rigidly with a disk $f$ is mounted loosely about the axle $a$, and gears with a compound pinion $g$ mounted freely on the plate $c$, and gearing in its turn with an internally toothed ring $h$ on the chain wheel $d$. Another and larger cog wheel $i$ connected rigidly with a disk $j$ is mounted loosely about the hollow axle of the cog wheel $e$ and also gears with the compound pinion $g$.

The method of holding the sun wheels $i$ and $e$ so as to prevent them in turn from revolving is as follows: Referring to Fig. 2 the edge of the disk $f$ is made not circular, but cam shaped, so as to present one or more teeth or steps in the direction of revolution. The disk $j$ has a ring formed on its outward face, which ring is flush with the disk $f$ and has its inner edge made, not circular, but cam shaped, so as to also present one or more teeth or steps in the direction of revolution. A catch $k$ is provided which projects into the space between the two cams, and is capable of being moved radially with respect to the disks so as to engage with either cam and thus arrest the motion of either disk and of the sun wheel attached to it.

The action is as follows. When the catch $k$ is in the central position shown, the disks $f$ and $j$ and with them the sun wheels $e$ and $i$, are free to revolve; consequently the planetary compound pinion $g$ is also free to revolve and therefore has no effect on the chain wheel $d$, which is then simply driven by the plate $c$ at the same pace as the crank. This gives the first or low speed. If however the catch $k$ be moved to engage a step on the edge of the disk $f$, this disk is prevented from revolving, and with it the sun wheel $e$. Consequently the planetary compound pinion $g$ as it is carried round by the plate $c$ is forced to revolve against the sun wheel $e$, and so drives the chain wheel $d$ faster than the crank. This gives the second or middle speed. If now the catch $k$ be moved to engage a step on the disk $j$, it prevents the disk $j$ from revolving, and with it the sun wheel $i$. Consequently the planetary compound pinion $g$ as it is carried round by the plate $c$ is forced to revolve against the sun wheel $i$ but at a faster rate than when it revolved against the sun wheel $e$, owing to the difference in diameters—so that the chain wheel $g$ is driven by it at a still greater speed above that of the crank. This gives the third or high speed.

The method of actuating the catch $k$ is not material, but the said catch is preferably arranged to have a certain amount of elasticity to either side in the direction of its motion, in order to facilitate its engagement with the cams. One convenient arrangement of operating the catch $k$ is shown, and consists of a hollow plunger $l$ which carries the catch and works in a tube $m$ suitably supported by the vehicle frame. The plunger by a spring $n$ located between a shoulder on the rod and a nut $o$ is yieldingly connected to a rod $p$ which projects beyond the tube $m$ through a nut $r$ and is connected to a wire or the like $s$, a spring $t$ being located between the end of the plunger and the nut $r$.

It is essential that the breadth of the catch $k$ should be somewhat less than the minimum distance between the opposed cam surfaces, in order that there may be no danger of both the disks being held at the same time.

Having now described my invention what I desire to secure by Letters Patent is:—

1. A variable speed mechanism including in combination a driver, a rotating part concentric with said driver and adapted to move at the same speed as, or different speeds than, said driver, sun wheels in connection with said driver, and normally free to revolve relative thereto, a planetary compound pinion in gear with said sun-wheels, a toothed ring carried by said rotating part, and means whereby either of the sun-wheels may be prevented from revolving, substantially as herein described.

2. A variable speed mechanism including in combination a driver, a rotating part concentric with said driver and adapted to move at the same speed as, or different speeds than said driver, sun-wheels in connection with said driver and normally free to revolve relative thereto, a planetary compound pinion in gear with said sun wheels, a toothed ring carried by said rotating part, and a radially movable catch whereby either of the sun-wheels may be prevented from revolving, substantially as herein described.

3. A variable speed mechanism including in combination a driver, a rotating part concentric with said driver and adapted to move at the same speed as, or different speeds than the said driver, sun-wheels in connection with said driver and normally free to revolve relative thereto, a planetary compound pinion in gear with said sun-wheels, a toothed ring carried by said rotating part, and a radially movable catch whereby either of the sun-wheels may be prevented from revolving, said catch being arranged yielding to either side in the direction of its motion, substantially as herein described.

4. A variable speed mechanism including in combination a driver, a rotating part concentric with said driver and adapted to move at the same speed as, or different speeds than said driver, sun wheels in connection with said driver, and normally free to revolve relative thereto, a planetary compound pinion in gear with said sun-wheels, a toothed ring carried by said rotating part, disks mounted concentrically with said sun-wheels and rigidly attached thereto, each disk to one sun-wheel, and a catch movable radially to engage with either of said disks, substantially as herein described.

5. A variable speed mechanism including in combination a driver, a rotating part concentric with said driver and adapted to move at the same speed as, or different speeds than said driver, sun-wheels in connection with said driver, and normally free to revolve relative thereto, a planetary compound pinion in gear with said sun-wheels, a toothed ring carried by said rotating part, disks mounted concentrically with said sun-wheels and rigidly attached thereto, each disk to one sun-wheel, said disks having cam-shaped edges so as to present steps in the direction of their revolution, and a catch movable radially to come in front of a step of either of said disks and thereby prevent same from revolving, substantially as herein described.

6. In a three speed mechanism of the kind described, the combination of two sun-wheels, two disks mounted concentrically with said sun-wheels and rigidly attached thereto, each disk to one sun-wheel, a cam on each of said disks and a catch movable radially between the cams to engage with either of said disks, substantially as described.

7. In a three speed mechanism of the kind described, the combination of two sun-wheels, two disks mounted concentrically with said sun-wheels and rigidly attached thereto, each disk to one sun-wheel, a cam on each of said disks a catch movable radially to engage with either of said disks, and means whereby said catch is provided with a certain amount of elasticity to either side in the direction of its motion, to facilitate its engagement with the cams, substantially as herein described.

In witness whereof I have hereunto set my hand in presence of two witnesses.

ALFRED JUKES ALLEN.

Witnesses:
HENRY CONRAD HEIDE,
ALBERT GEORGE BARNES.